(12) United States Patent
Choi et al.

(10) Patent No.: US 12,349,690 B2
(45) Date of Patent: Jul. 8, 2025

(54) FOOD PROCESSOR

(71) Applicant: LG ELECTRONICS INC., Seoul (KR)

(72) Inventors: Younsung Choi, Seoul (KR); Eunjung Lee, Seoul (KR); Kangseong Lee, Seoul (KR); Takashi Morimoto, Seoul (KR); Masako Ikeda, Seoul (KR); Hiromu Imanishi, Seoul (KR); Masami Yokota, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 944 days.

(21) Appl. No.: 17/127,311

(22) Filed: Dec. 18, 2020

(65) Prior Publication Data

US 2021/0186063 A1   Jun. 24, 2021

(30) Foreign Application Priority Data

Dec. 20, 2019   (KR) .................. 10-2019-0171764

(51) Int. Cl.
   *A23B 2/30*       (2025.01)
   *A47J 43/06*      (2006.01)
   *A47J 43/08*      (2006.01)

(52) U.S. Cl.
   CPC ............. *A23B 2/30* (2025.01); *A47J 43/06* (2013.01); *A47J 43/085* (2013.01)

(58) Field of Classification Search
   CPC .... A23L 3/10; A23L 3/40; A23P 30/00; A47J 43/06; A47J 43/0727; A47J 43/085; B02C 18/0092; B02C 18/12; F26B 11/12; F26B 3/02
   See application file for complete search history.

(56) References Cited

FOREIGN PATENT DOCUMENTS

| CN | 109499701 A | * | 3/2019 | ......... B02C 18/0092 |
|---|---|---|---|---|
| CN | 110340110 A | * | 10/2019 | |
| KR | 20000034880 A | * | 6/2000 | |
| KR | 200414796 Y1 | * | 4/2006 | |
| KR | 20090006577 U | * | 12/2007 | |

(Continued)

OTHER PUBLICATIONS

Machine translation of KR-20000034880: Yuk, a instant noodle automatic selling machine, 1999 (Year: 1999).*

(Continued)

*Primary Examiner* — Dana Ross
*Assistant Examiner* — Abigail H Rhue
(74) *Attorney, Agent, or Firm* — Birch, Stewart, Kolasch & Birch, LLP

(57) ABSTRACT

A food processor is disclosed and includes a main body, a grinding container mounted in a portion of the main body and forming a space therein, a grinder rotatably disposed in the grinding container, a grinding motor for rotating the grinder, a drying container mounted under the grinding container inside the main body and forming a space therein, a heating device for supplying heated air to the drying container, and a discharge container detachably mounted under the drying container inside the main body and forming a space therein. The grinding container has a surface facing the drying container that is openable toward the drying container, and the drying container includes one side surface formed so as to be openable toward the discharge container.

15 Claims, 15 Drawing Sheets

(56) References Cited

FOREIGN PATENT DOCUMENTS

KR           101805033 B1 *  7/2013
WO    WO-2009029790 A1 *  3/2009   .............. G01F 11/18

OTHER PUBLICATIONS

Machine translation of KR-200414796: Jung, Apparatus for Garbage Processing, 2006 (Year: 2006).*
Machine translation of KR-20090006577: Kim, a drying machine for food wastes, 2007 (Year: 2007).*
Machine translation of KR-101805033: Jeong, Apparatus for grinding food materials, 2017 (Year: 2017).*
Machine translation of CN-110340110: Li, Construction waste treatment equipment with crushing function, 2019 (Year: 2019).*
Machine translation of CN-109499701: Du, Food waste crusher with collection function, 2019 (Year: 2019).*

* cited by examiner

FOOD PROCESSOR

CROSS-REFERENCE TO RELATED APPLICATION

This application claims the priority benefit of Korean Patent Application No. 10-2019-0171764, filed in the Republic of Korea on Dec. 20, 2019, the disclosure of which is incorporated herein by reference.

BACKGROUND

Field of the Invention

The present disclosure relates to a food processor, and more particularly to a food processor so as to store the food ingredients for a long time by grinding and drying the same.

Description of the Related Art

When food is cooked at home or in restaurants, portions of some ingredients may be cut off and left in small quantities. Such leftover food ingredients may be stored separately and used later. However, if food ingredients are exposed to external air or water, the storage period thereof is shortened. In other words, if peeled or shelled food ingredients are exposed to the external environment, they spoil faster than unprocessed materials, and thus the storage period thereof is shortened.

If leftover food ingredients are not used within a short period, they are difficult to reuse and are thrown out as food waste. In a household in which food is not often cooked, leftover food ingredients are therefore frequently thrown out as food waste.

An apparatus for grinding or dehydrating leftover food ingredients to store the same is disclosed in Korean Utility Model Registration No. 20-0475461. However, if leftover food ingredients are not completely dried, it is still difficult to store the same for a long time.

SUMMARY

It is an object of the present disclosure to provide a food processor for treating leftover food ingredients so as to store the food ingredients for an extended period of time.

It is another object of the present disclosure to provide a food processor capable of performing various treatment processes for securing a storage period of food ingredients and of performing the treatment processes sequentially.

It is still another object of the present disclosure to provide a food processor for transforming leftover food ingredients into a form that is convenient to use, for example, a powder form.

However, the objects to be accomplished by the embodiments are not limited to the above-mentioned objects, and other objects not mentioned herein will be clearly understood by those skilled in the art from the following description.

A food processor in accordance with an exemplary embodiment of the present disclosure for accomplishing the above and other objects may include a main body, a grinding container mounted in a portion of the main body and forming a space therein, a grinder rotatably disposed in the grinding container, a grinding motor configured to rotate the grinder, a drying container mounted under the grinding container inside the main body and forming a space therein, a heating device configured to supply heated air to the drying container, and a discharge container detachably mounted under the drying container inside the main body and forming a space therein. The grinding container may be configured such that a surface thereof facing the drying container is openable toward the drying container, and the drying container may include one side surface formed so as to be openable toward the discharge container, thereby delivering a ground and dried object to the discharge container.

The grinding container may include a grinding container lower plate, on which the grinder and the grinding motor are disposed, and a grinding container side plate extending vertically in an upward direction from the outer circumference of the grinding container lower plate and forming an internal space in the grinding container.

The grinding container lower plate may be rotatably coupled to a portion of the grinding container side plate. The grinding container lower plate may be disposed so as to be perpendicular to the grinding container side plate, or may be rotated downwards toward the drying container. The grinding container may store an object to be ground therein, or may deliver the object to the drying container disposed thereunder.

The grinding container lower plate may be provided at both (i.e., two) ends thereof with grinding container gears, and the grinding container gears may be disposed on an imaginary rotation axis, about which the grinding container lower plate is rotated, so as to be rotated together with the grinding container lower plate. The main body may be provided with first body gears, which are configured to mesh with the grinding container gears when the grinding container is mounted in the main body, and a first body gear motor configured to rotate the first body gears. Thus, when the grinding container is mounted in the main body, the grinding container lower plate may be rotated.

The grinding container may be provided with leaf springs configured to restrict rotation of the grinding container gears in one direction. Thus, when the grinding container is drawn out of the main body, the grinding container lower plate may be maintained in a fixed state.

The food processor may further include an inner container having a hollow cylindrical shape and disposed inside the grinding container so that the object is effectively ground by the grinder.

The drying container may include a drying container lower plate having a mesh-type structure and a drying container side plate extending vertically in the upward direction from the outer circumference of the drying container lower plate. The drying container lower plate may be rotatably coupled to the drying container side plate so that an object to be dried is placed in the drying container or is delivered to the discharge container.

The drying container may include first drying container gears secured to one end or both (i.e., two) ends of the drying container lower plate on a rotation axis of the drying container lower plate. The drying container lower plate may be rotated by the first drying container gears.

The drying container side plate may include a first surface disposed inside the main body when the drying container is mounted in the main body and a second surface exposed to the outside of the main body. The second surface may have a discharge hole formed in an upper portion thereof so as to discharge air supplied from the heating device to the outside. Thus, the heated air supplied to the drying container may circulate in the drying container, and may be discharged through the discharge hole.

A protruding rib may be formed on the inner side of the second surface in order to limit the range within which the drying container lower plate is rotated upwards. Thus, it is possible to limit the rotation of the drying container lower plate and to prevent the dried object in the drying container from entering the heating device.

The first surface may include an upper fixed surface fixedly disposed at a position spaced upwards apart from the drying container lower plate and a lower rotary surface disposed under the upper fixed surface and rotatably coupled to the upper fixed surface. Thus, the drying container may be open toward the discharge container.

Second drying container gears may be disposed at both side ends of the lower rotary surface. The second drying container gears may be rotated in engagement with the first drying container gears in order to rotate the lower rotary surface. Thus, the drying container lower plate and the lower rotary surface may be operated in an interlocked manner.

When the drying container lower plate is rotated into a space defined by the drying container side plate, the second drying container gears may be rotated in engagement with the first drying container gears, and the lower rotary surface may be rotated to the outside of the drying container. Thus, the drying container may be open toward the discharge container.

Second body gears, configured to mesh with the second drying container gears when the drying container is mounted in the main body, and a second body gear motor, configured to rotate the second body gears, may be disposed in the main body. Thus, when the drying container is mounted in the main body, the drying container may be open toward the discharge container.

The heating device may include a heater configured to heat air, a blower fan configured to blow air heated by the heater to the drying container, and a blower motor configured to rotate the blower fan.

The food processor may further include a seasoning storage unit configured to store seasoning to be added to an object ground in the grinding container and dried in the drying container. Thus, it is possible to add the seasoning to the object that has passed through the grinding container and the drying container.

The seasoning storage unit may include a plurality of storage containers, which are formed so as to be isolated from each other and to store plural kinds of seasoning, and a drawer, to which the plurality of storage containers is mounted and which is configured to insert or withdraw the plurality of storage containers into or out of the main body. Thus, plural kinds of seasoning may be stored.

Each of the plurality of storage containers may include a storage container lower plate having therein a plurality of openings spaced apart from each other in a horizontal direction. The drawer may include an opening cover disposed at a lower side thereof in order to open and close the openings in the plurality of storage containers. Thus, the seasoning stored in the plurality of storage containers may be delivered to the discharge container.

The opening cover may include a plurality of covers, which cover the openings formed in the storage container lower plate so as to be spaced apart from each other in the horizontal direction, and a plurality of holes, which expose the openings. The plurality of covers and the plurality of holes may be alternately disposed.

The opening cover may be disposed at a lower side of the drawer so as to be movable in the horizontal direction. Thus, the seasoning stored in the storage containers may be delivered to the discharge container through the plurality of holes.

Details of other embodiments are included in the detailed description and the accompanying drawings.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION OF THE EMBODIMENTS

Figure 1:
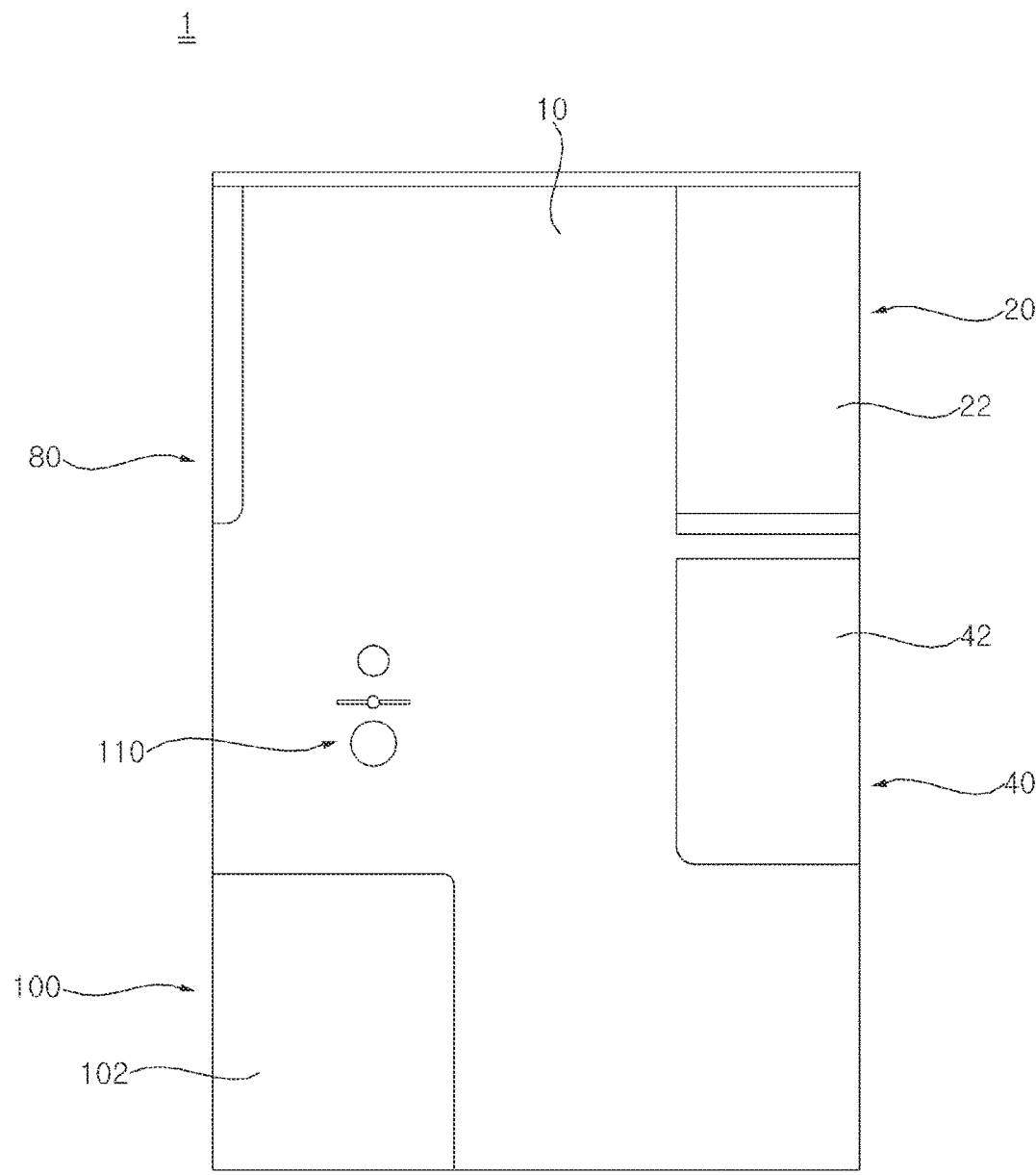
FIG. 1 is a side view of a food processor according to an embodiment of the present disclosure.

Advantages and features of the present disclosure and methods for achieving them will be made clear from embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims. The same reference numerals used throughout the specification refer to the same constituent elements.

Hereinafter, a food processor according to embodiments of the present disclosure will be described with reference to the accompanying drawings.

Overall Configuration

Figure 2:
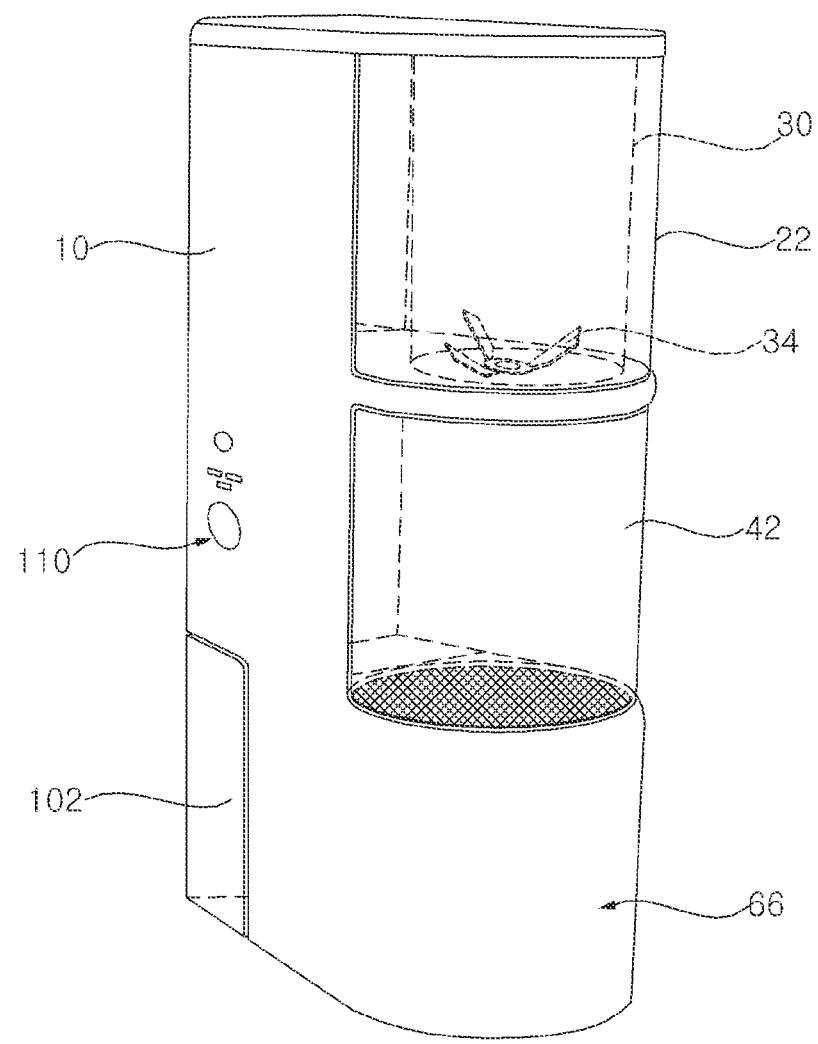
FIG. 2 is a perspective view of the food processor according to an embodiment of the present disclosure.
Figure 3:
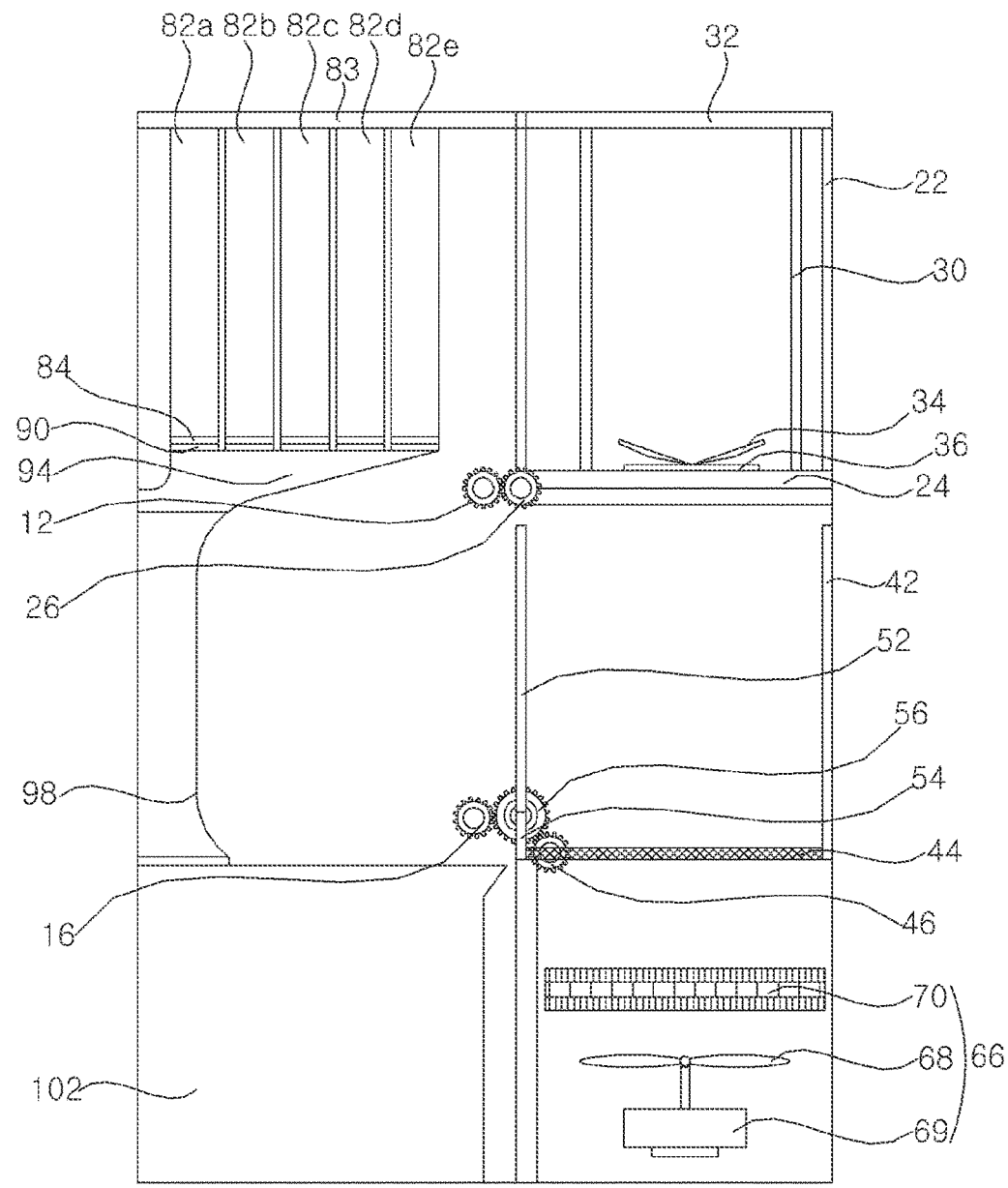
FIG. 3 is a schematic cross-sectional view of the food processor according to an embodiment of the present disclosure.
Figure 4:
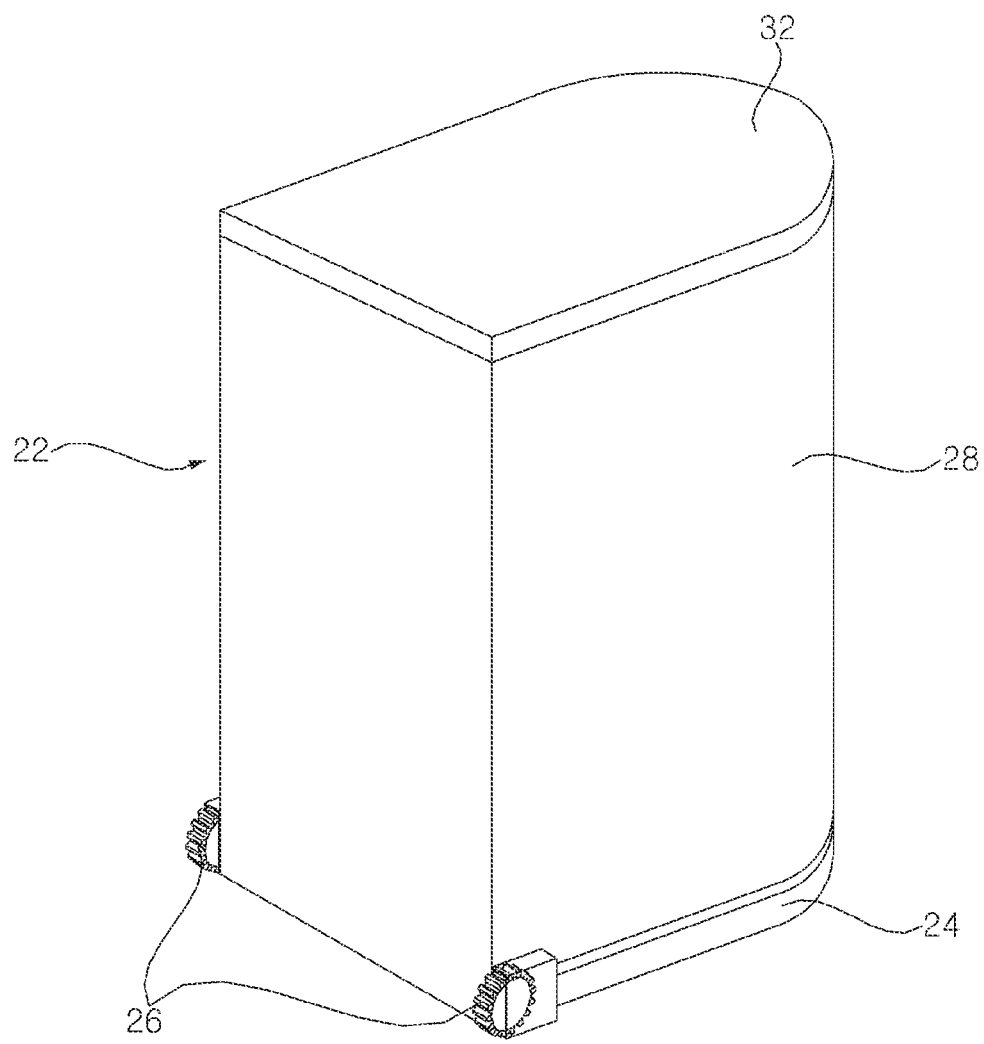
FIG. 4 is a perspective view of a grinding container according to an embodiment of the present disclosure.

Referring to FIGS. 1 to 3, a food processor 1 of the present disclosure includes a grinding unit 20 (i.e., grinder) configured to grind an object, a drying unit 40 (i.e., dryer) configured to dry the ground object, and a discharge unit 100 (i.e., discharge assembly) configured to accommodate the ground and dried object and to be capable of being withdrawn to the outside.

Here, the object may be a food ingredient that is put into the grinding unit 20 by the user so as to be ground and dried by the food processor. The food ingredient may be an unused food ingredient or a food ingredient left over after cooking.

The food processor of the present disclosure may further include a seasoning storage unit 80 configured to store seasoning so as to add the seasoning to the ground and dried object.

The food processor 1 of the present disclosure includes a main body 10 accommodating the grinding unit 20, the drying unit 40, and the discharge unit 100. The grinding unit 20 is disposed above the drying unit 40 inside the main body 10. A drying container 42, which is one of the components of the drying unit 40, is disposed above the discharge unit 100 inside the main body 10.

The main body 10 forms therein a mounting space in which a grinding container 22 of the grinding unit 20 and the drying container 42 of the drying unit 40 are mounted.

The food processor 1 of the present disclosure includes an input unit 110 configured as, for example, a button so that the user operates the food processor 1 using the same and a controller (i.e., CPU, processor) configured to control the operation of the grinding unit 20 or the drying unit 40 in response to a user command received from the input unit 110.

The input unit 110 is disposed on one side of the main body 10 so that the user operates the food processor 1.

Grinding Unit

Hereinafter, the grinding unit 20 will be described with reference to FIGS. 3 to 5C.

The grinding unit 20 includes a grinding container 22, which forms a space for accommodating an object, a grinder 34, which is rotatably disposed in the grinding container 22 and rotates to grind the object, and a grinding motor 36, which rotates the grinder 34.

The grinding container 22 has a shape having an open upper side. The grinding unit 20 may further include a grinding container cover 32, which opens and closes the open upper side of the grinding container 22. The grinding container 22 includes a grinding container lower plate 24, on which the grinder 34 and the grinding motor 36 are disposed, and a grinding container side plate 28, which extends vertically in an upward direction from the outer circumference of the grinding container lower plate 24 and forms an internal space in the grinding container 22.

The grinder 34 is rotatably disposed on the grinding container lower plate 24. The grinding motor 36, which is connected to the grinder 34, is disposed inside the grinding container lower plate 24. The grinding motor 36 is secured to the inner side of the grinding container lower plate 24.

The grinding container lower plate 24 may be rotatably coupled to the grinding container side plate 28. The grinding container lower plate 24 may be hinged to the grinding container side plate 28. The grinding container lower plate 24 may be provided with a hinge shaft, and grinding container gears 26 may be disposed at both end portions of the hinge shaft so as to rotate together with the grinding container lower plate 24. Leaf springs may be connected to the grinding container gears 26 so as to restrict the rotation of the grinding container gears 26 in one direction.

When no external force is applied to the grinding container gears 26, the grinding container lower plate 24 is in close contact with the lower side of the grinding container side plate 28 due to the elastic force of the leaf springs applied to the grinding container gears 26. Therefore, when no external force is applied to the grinding container gears 26, the grinding container lower plate 24 may close the lower portion of the internal space defined by the grinding container side plate 28. That is, when no external force is applied to the grinding container gears 26, the object may be kept in the grinding container 22.

The portion of the grinding container lower plate 24 that is rotatably coupled to the grinding container side plate 28 may form a straight surface, and the remaining portion thereof may form a substantially semicircular-shaped surface.

The grinding container side plate 28 forms a columnar shape that is open in an upward-downward direction. The grinding container side plate 28 forms a surface extending upwards along the circumference of the grinding container lower plate 24 so as to contact the edge portion of the grinding container lower plate 24.

The grinding unit 20 may further include an inner container 30, which has a cylindrical shape and is disposed inside the grinding container 22. The inner container is disposed around the grinder 34 and forms a space in which the object is ground.

The inner container 30 has a cylindrical shape that is open in the upward-downward direction. The inner container 30 is disposed inside the grinding container 22 such that the grinder 34 is disposed at the center of the circular cross-section thereof. The inner container 30 may form a surface that is disposed around the grinder 34 while being spaced at a constant interval apart therefrom so that the object is evenly ground by the grinder 34.

The grinding unit 20 further includes a grinding container cover 32, which is disposed on the grinding container 22 and opens and closes the open upper side of the grinding container 22. The grinding container cover 32 may be hinged to the upper side of the grinding container 22.

First body gears 12, which mesh with the grinding container gears 26 when the grinding container 22 is mounted in the main body 10, and a first body gear motor 14 for rotating the first body gears 12 are disposed in the main body 10. The first body gears 12 and the first body gear motor 14 are secured to the inner side of the main body 10.

Therefore, the lower side of the grinding container 22 may be opened or closed in accordance with the rotation of the first body gear motor 14.

Figure 5A:
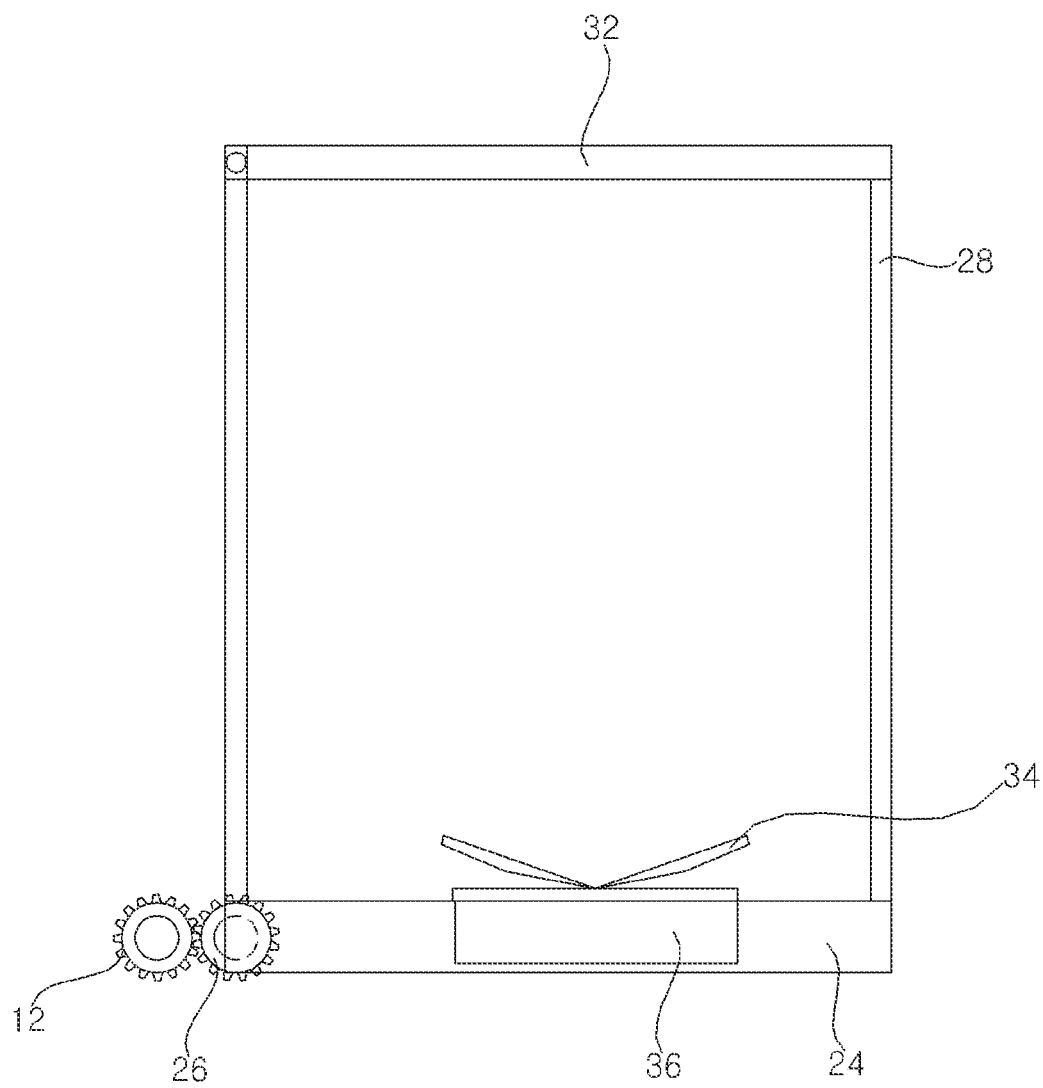
FIG. 5A is a schematic cross-sectional view of the grinding container and first body gears according to an embodiment of the present disclosure.
Figure 5B:
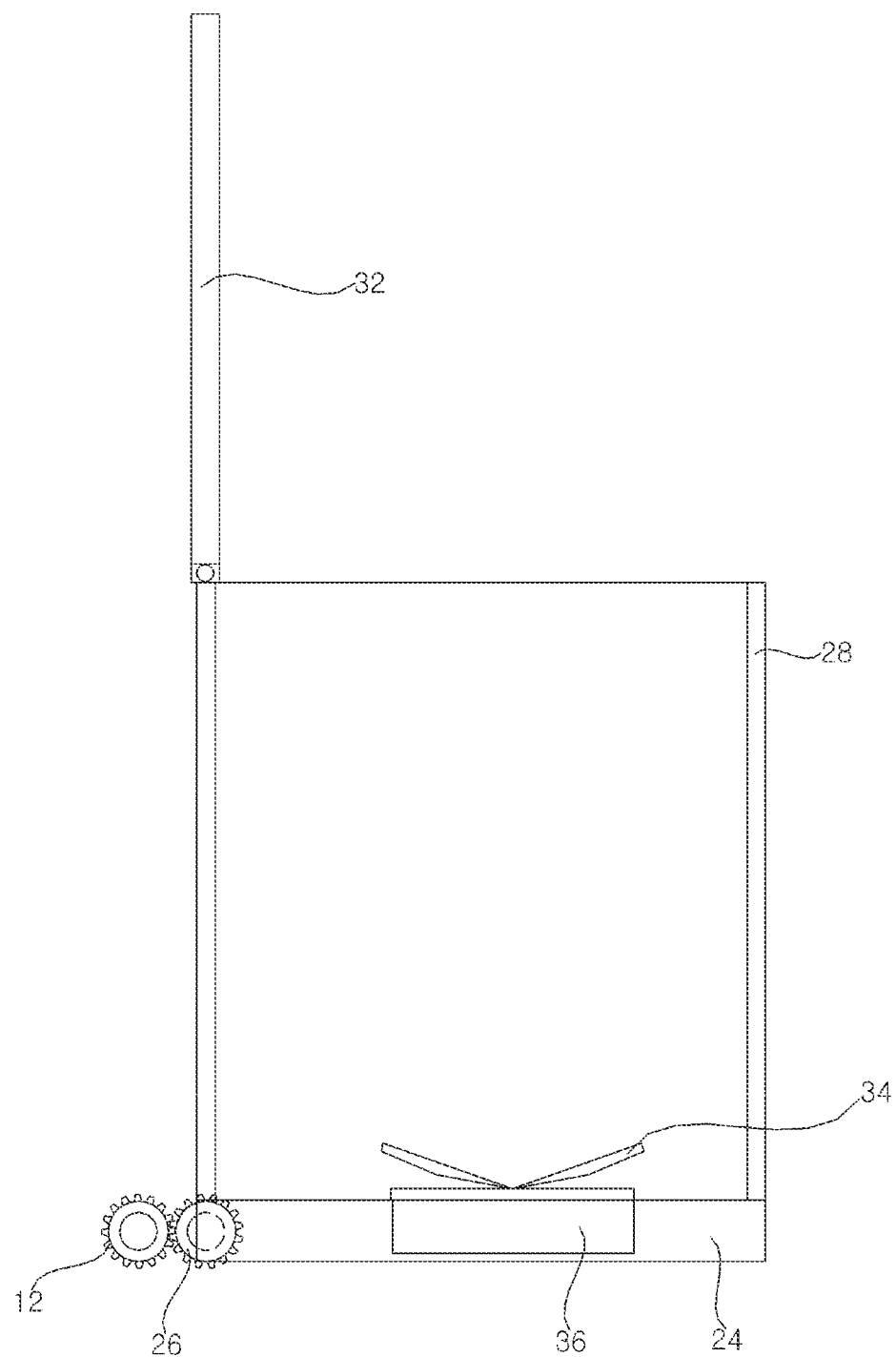
FIG. 5B is a view showing the state in which the grinding container cover of FIG. 5A is open.
Figure 5C:
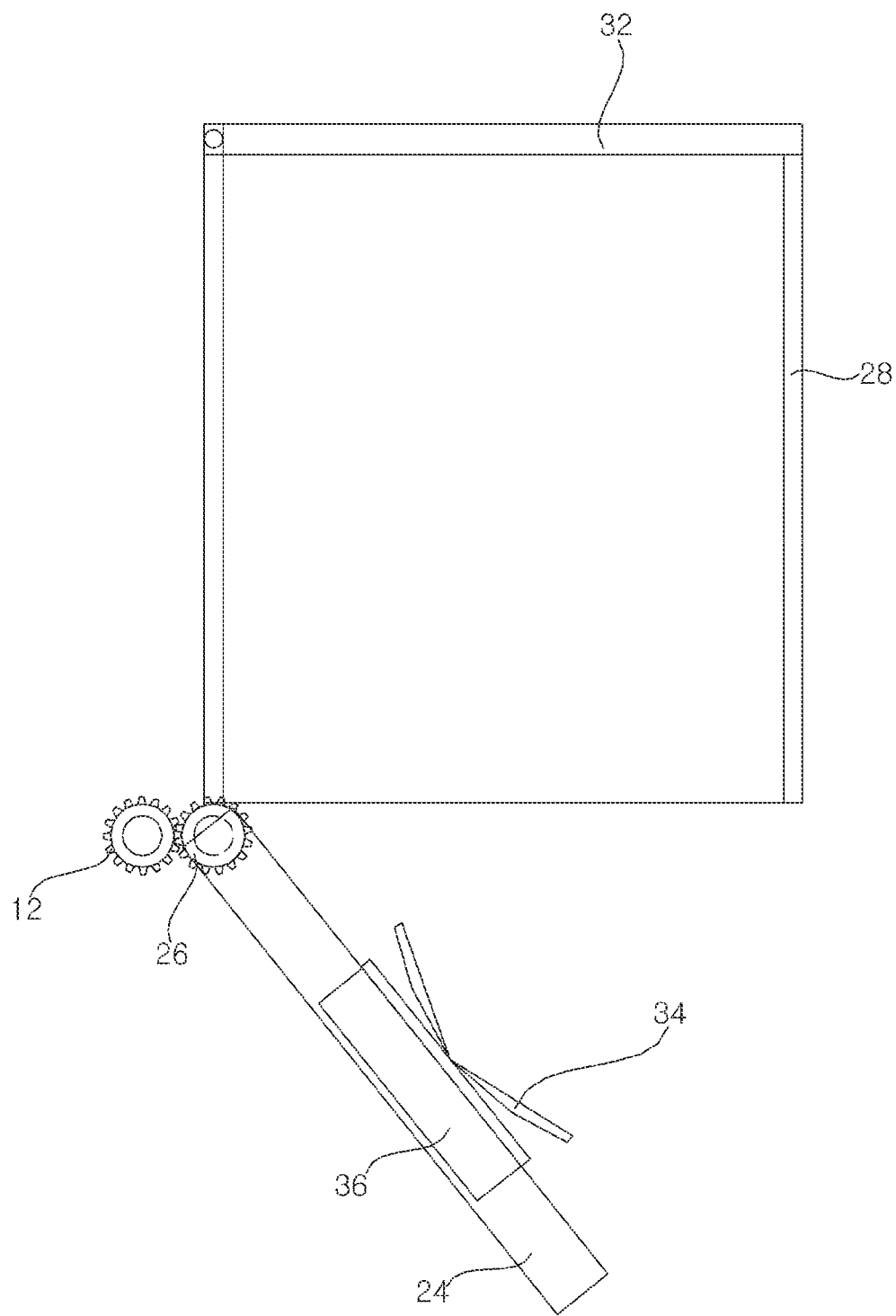
FIG. 5C is a view showing the state in which the grinding container lower plate of the FIG. 5A is open.
Figure 6:
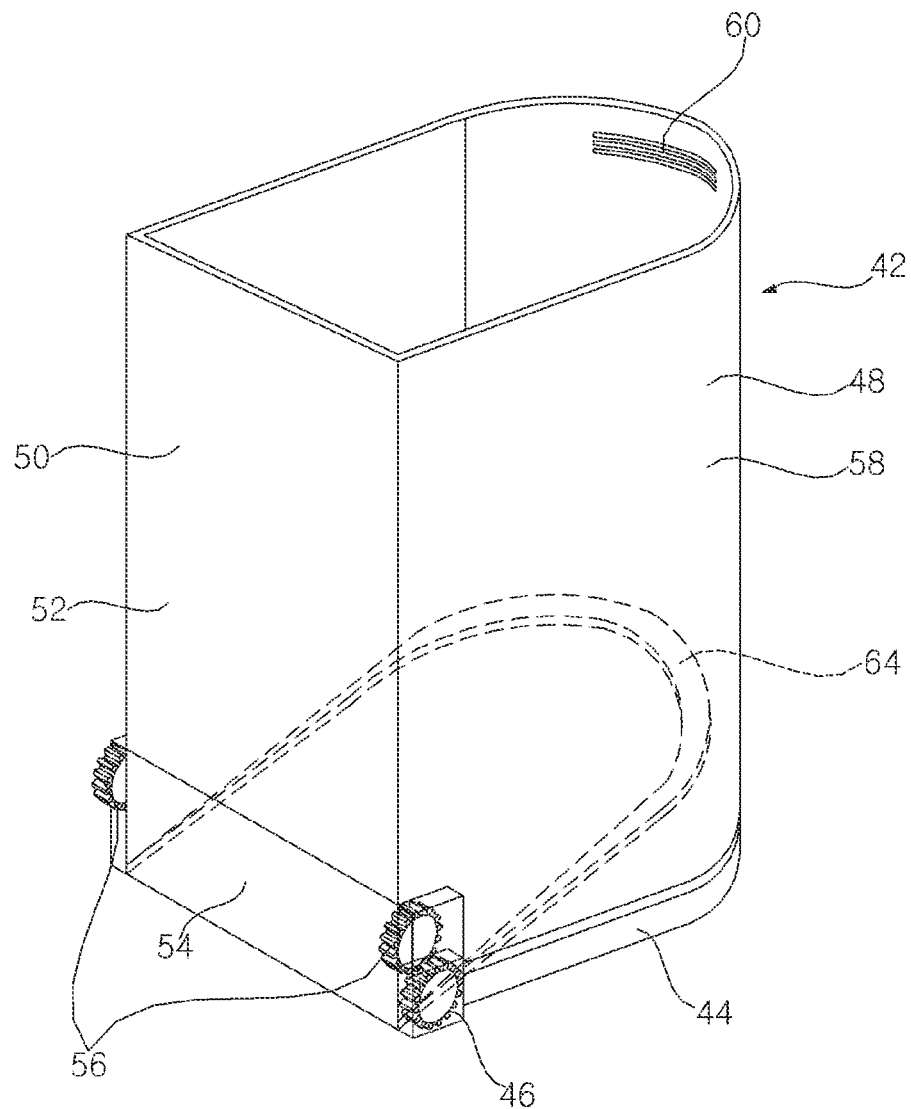
FIG. 6 is a perspective view of a drying container according to an embodiment of the present disclosure.

Hereinafter, the operation of the grinding unit 20 will be described with reference to FIGS. 5A to 5C.

The user may put an object into the grinding container 22, and may insert the grinding container 22 into the main body 10. When the grinding container 22 is inserted into the main body 10, the grinding container lower plate 24 may be maintained in contact with the grinding container side plate 28, and the object may be located in the grinding container 22. Specifically, the user may put the object into the inner container 30.

In the state in which the grinding container lower plate 24 is in contact with the grinding container side plate 28, the grinder 34 may rotate to grind the object. The grinder 34 may be rotated by the grinding motor 36.

When the grinding motor 36 is stopped, the rotation of the grinder may be stopped. Thereafter, the grinding container lower plate 24 may be rotated. When the first body gears 12 mounted in the main body 10 are rotated, the grinding container gears 26 may be rotated such that the grinding container lower plate 24 is rotated downwards, as shown in FIG. 5C. That is, the grinding container lower plate 24 may be rotated toward the drying container so that the object in the grinding container 22 moves to the drying container 42. Thereafter, the grinding container lower plate 24 may be rotated in the reverse direction when the first body gears 12 are rotated in the reverse direction by the first body gear motor 14, or may be rotated in the reverse direction by the restoring force of the leaf springs. At this time, the grinding container lower plate 24 may be brought into contact with the grinding container side plate 28, and may close the lower side of the grinding container 22.

Drying Unit

Hereinafter, the drying unit 40 will be described with reference to FIGS. 3 and 6 to 7C.

The drying unit 40 includes a drying container 42, which is disposed under the grinding container 22 and forms a space for accommodating the object, and a heating device 66, which is disposed under the drying container 42 and supplies heated air to the drying container 42.

The drying container 42 has a columnar shape having an open upper side. The drying container 42 has a lower surface that has a mesh-type structure so as to communicate with a space formed under the drying container 42.

The drying container 42 includes a drying container lower plate 44, which has a mesh-type structure so that the object is loaded thereon, and a drying container side plate 48, which extends vertically in the upward direction from the outer circumference of the drying container lower plate 44. The drying container lower plate 44 may be rotatably coupled to the drying container side plate 48. The drying container lower plate 44 may have a structure that is openable so that the object in the drying container 42 moves to a discharge container 102.

The drying container lower plate 44 may be hinged to the rear-lower-end portion of the drying container side plate 48. The drying container lower plate 44 may have a mesh structure so as to allow the space thereabove and the space thereunder to communicate with each other. Therefore, the heated air supplied from the heating device 66, which is disposed under the drying container 42, may enter the drying container 42.

The drying container lower plate 44 may be provided with a hinge shaft, and the drying container 42 may include first drying container gears 46, which are secured to one end or both ends of the hinge shaft. The first drying container gears 46 may be disposed at a portion of the drying container side plate 48, and may be rotated together with the drying container lower plate 44. Leaf springs may be mounted to the first drying container gears 46 so as to limit the movement of the drying container lower plate 44. That is, when no external force is applied to the first drying container gears 46, the drying container lower plate 44 may be disposed so as to be perpendicular to the drying container side plate 48, whereby the object may be stably located in the internal space in the drying container.

The drying container lower plate 44 may be disposed so as to be rotated into the drying container 42. When a separate external force is applied thereto, the drying container lower plate 44 may be rotated into the space defined by the drying container side plate 48.

The drying container side plate 48 may include a first surface 50 (i.e., first wall), which is disposed inside the main body 10 when the drying container 42 is mounted in the main body 10, and a second surface 58 (i.e., second wall), which is exposed to the outside of the main body 10. The drying container side plate 48 has a discharge hole 60 formed in a portion thereof so as to discharge the air supplied from the heating device 66 to the outside. The discharge hole 60 is formed in the upper portion of the second surface 58.

The second surface 58 is exposed to the outside when the drying container 42 is mounted in the main body 10. The second surface 58 may have a curved shape. A protruding rib 64 is formed on the inner side of the second surface 58 in order to limit the range within which the drying container lower plate 44 is rotated upwards. In the state in which the drying container lower plate 44 is rotated upwards, the outer circumference of the drying container lower plate 44 is in contact with the protruding rib 64. In the state in which the drying container lower plate 44 is in contact with the protruding rib 64, the protruding rib 64 may block the gap between the drying container lower plate 44 and the second surface 58.

The first surface 50 may be formed as a flat surface. The first surface 50 is hinged to the drying container lower plate 44. The first surface 50 may include an upper fixed surface 52 (i.e., upper fixed wall), which is fixedly disposed at a position spaced upwards apart from the drying container lower plate 44, and a lower rotary surface 54 (i.e., lower rotary wall), which is disposed under the upper fixed surface 52 and is rotatably coupled to the upper fixed surface 52. The upper fixed surface 52 and the second surface 58 are disposed in a fixed manner.

The lower rotary surface 54 has a structure that is rotated in a manner in which it is interlocked with the drying container lower plate 44. Second drying container gears 56, which are engaged with the first drying container gears 46, are disposed at both side ends of the lower rotary surface 54. The lower rotary surface 54 is rotated in a direction opposite the direction in which the drying container lower plate 44 is rotated.

Therefore, when the drying container lower plate 44 is rotated into the space defined by the drying container side plate 48, the second drying container gears 56 are rotated in engagement with the first drying container gears 46, and the lower rotary surface 54 is rotated to the outside of the drying container 42.

Second body gears 16, which mesh with the second drying container gears 56 when the drying container 42 is mounted in the main body 10, and a second body gear motor 18 for rotating the second body gears 16 are disposed in the main body 10. The second body gears 16 and the second body gear motor 18 are secured to the inner side of the main body 10.

When the second body gear motor 18 is rotated, the second drying container gears 56 are rotated, and the lower rotary surface 54 is therefore rotated to the outside of the drying container 42. The first drying container gears 46 are rotated by the operation of the second body gear motor 18, and the drying container lower plate 44 is therefore rotated upwards.

The heating device 66 is disposed under the drying container 42 and supplies heated air to the drying container 42. The heating device 66 includes a heater 70 for heating air, a blower fan 68 for blowing the air heated by the heater 70 to the drying container 42, and a blower motor 69 for rotating the blower fan 68. The heating device 66 is disposed in the internal space in the main body 10, which is disposed under the drying container 42. A positive temperature coefficient (PTC) heater may be used as the heater 70.

Figure 7A:
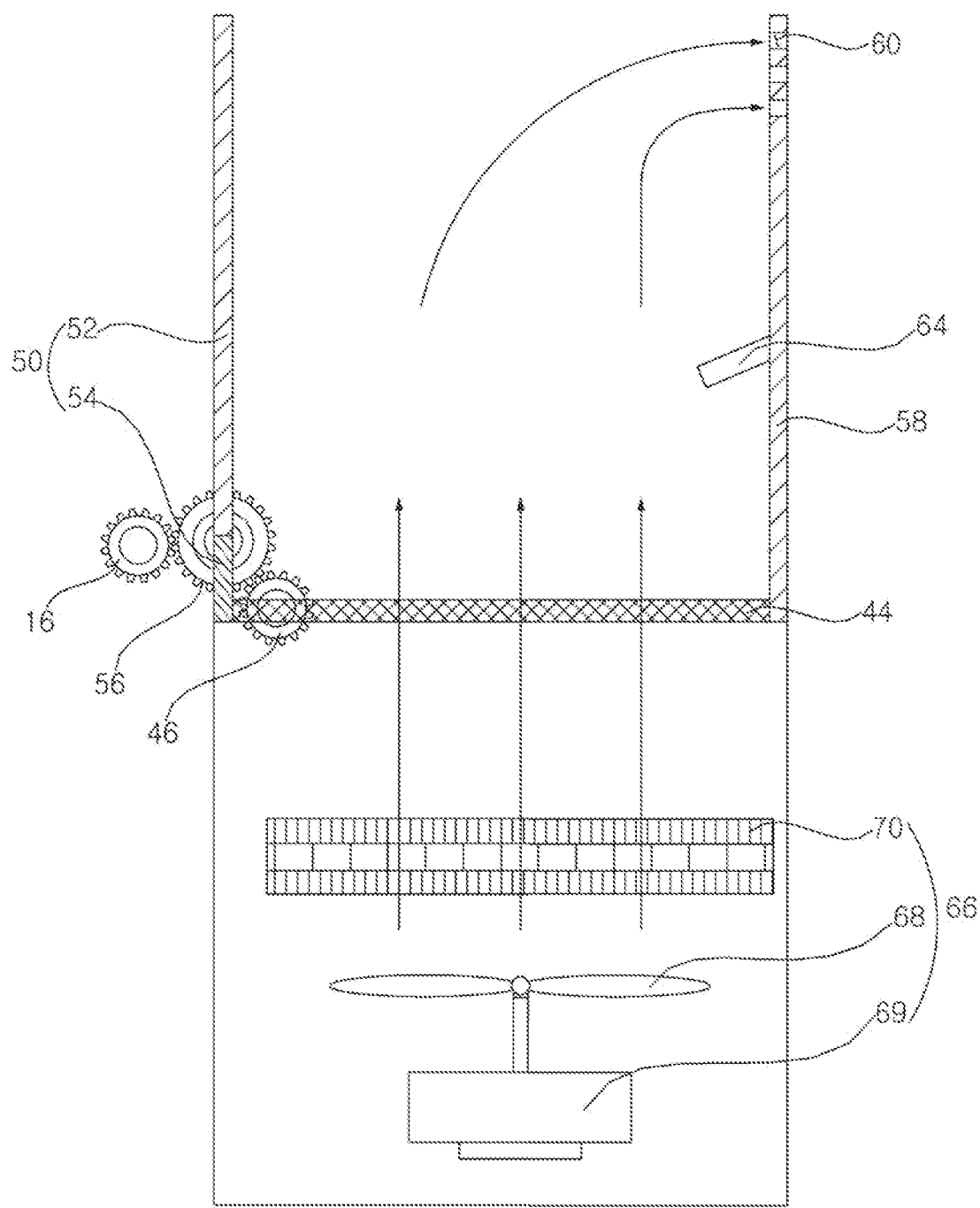
FIG. 7A is a schematic cross-sectional view of the drying container and second body gears according to an embodiment of the present disclosure.
Figure 7B:
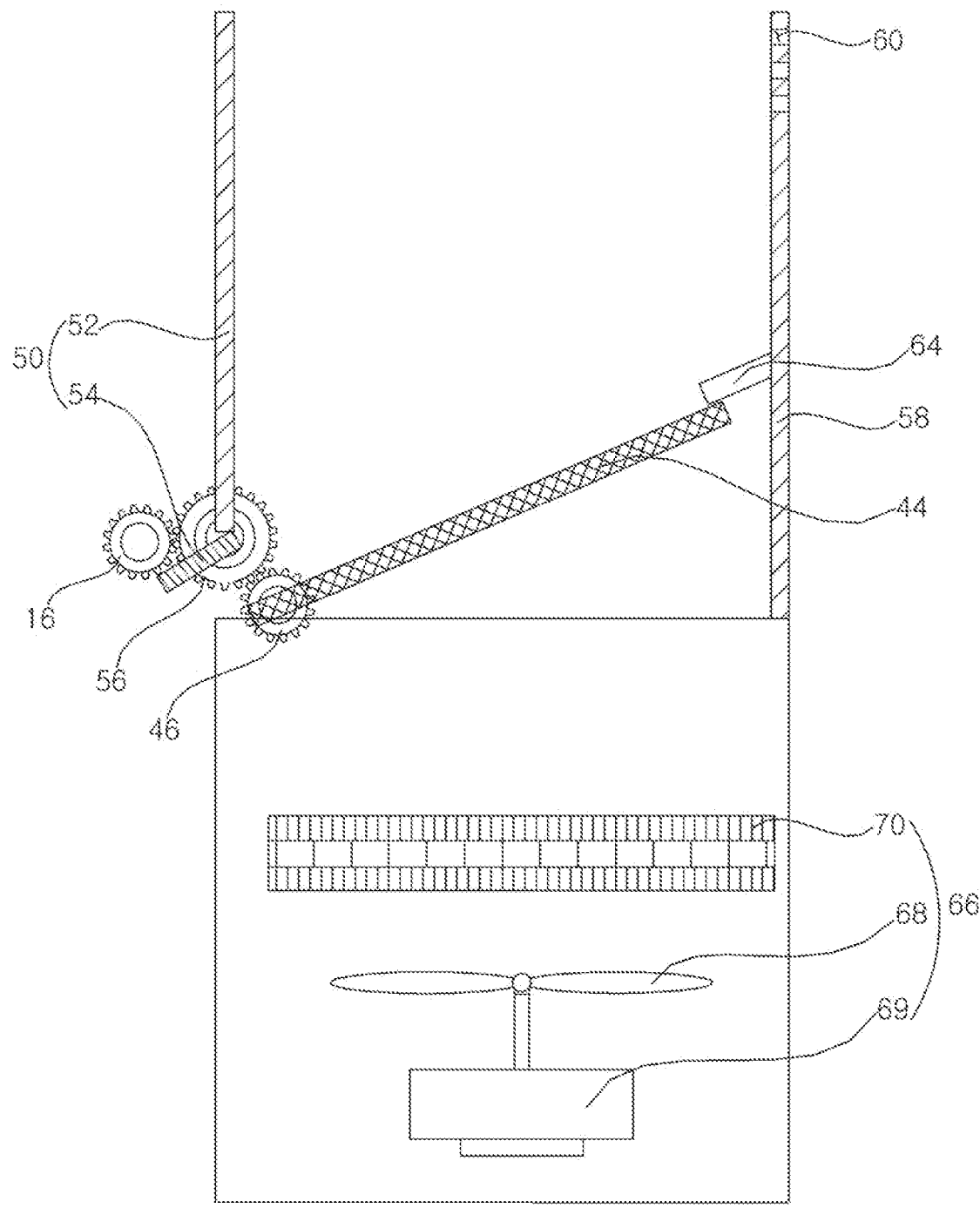
FIG. 7B is a view showing the state in which the drying container lower plate and the lower rotary surface of FIG. 7A are moved.
Figure 7C:
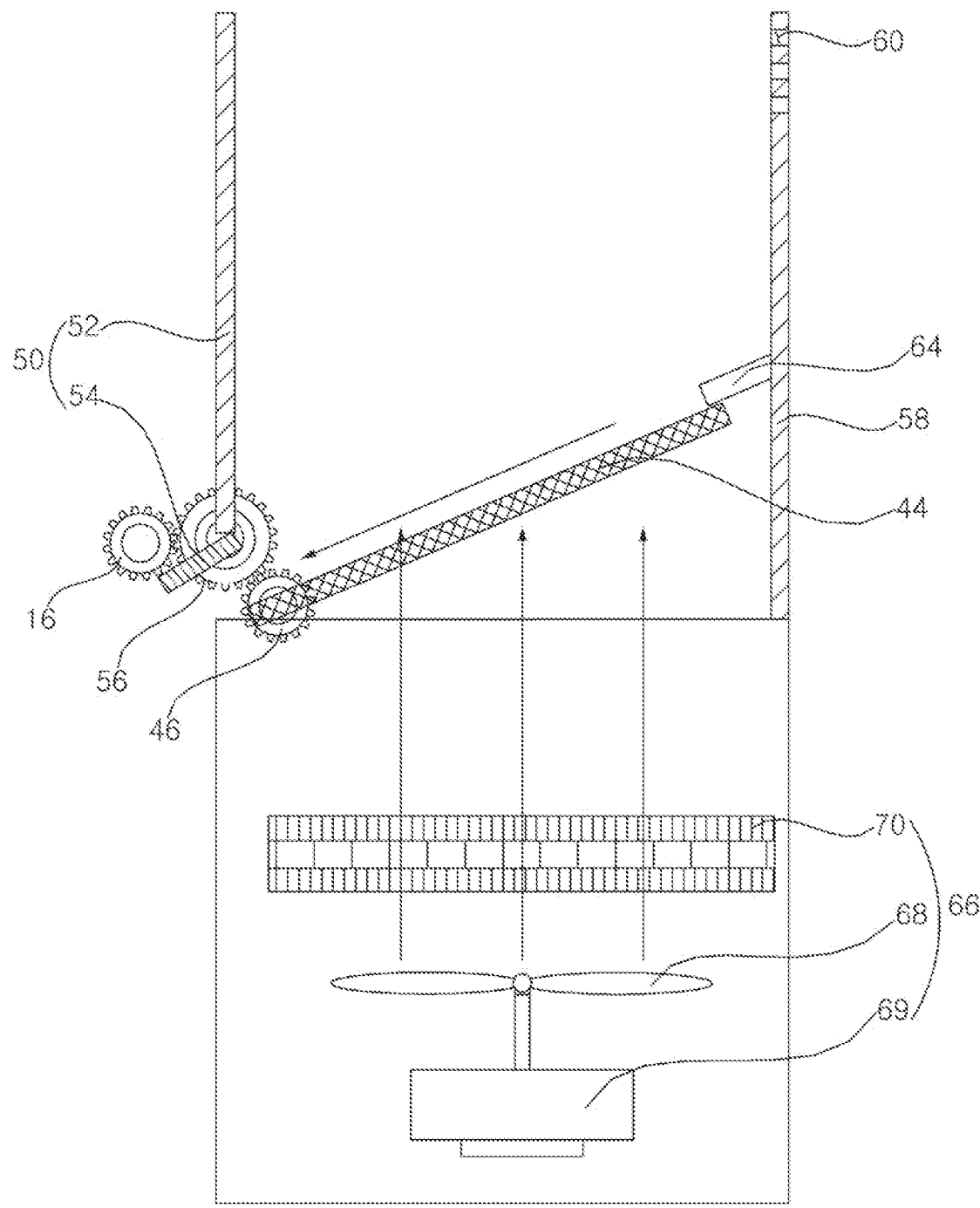
FIG. 7C is a view for explaining the direction in which an object is moved by rotation of a blower fan in the drying container of FIG. 7B.

Hereinafter, the operation of the drying unit 40 will be described with reference to FIGS. 7A to 7C.

In the state in which the drying container 42 is mounted in the main body 10, the object in the grinding container 22 may be moved to the drying container 42. In the state in which the drying container 42 is mounted in the main body 10, the drying container lower plate 44 may be disposed so as to be perpendicular to the drying container side plate 48. In the state in which the drying container 42 is mounted in the main body 10, the lower rotary surface 54 may be disposed in alignment with the upper fixed surface 52.

In the state in which the object is placed in the drying container 42, the heating device 66 is operated to dry the object placed in the drying container 42. Here, the heating device 66 may be operated such that the heater 70 is operated to heat air and the blower motor 69 is operated to rotate the blower fan 68.

The air heated by the operation of the heating device 66 may be introduced into the drying container 42, and may dry the object. The heated air introduced into the drying container 42 by the operation of the heating device 66 may be discharged to the outside through the discharge hole 60 formed in the drying container 42 via the drying container 42.

When the object is completely dried, the operation of the heating device 66 is stopped, and the second body gear motor 18 is operated. The second body gears 16, the second drying container gears 56 engaged with the second body gears 16, and the first drying container gears 46 engaged with the second drying container gears 56 are rotated by the operation of the second body gear motor 18.

Therefore, the drying container lower plate 44 is rotated to the inside of the drying container 42, and the lower rotary surface 54 of the drying container side plate 48 is rotated to the outside of the drying container 42. That is, the drying container 42 is open toward the discharge container 102.

The drying container lower plate 44 is brought into contact with the protruding rib 64 formed on the inner side of the drying container side plate 48. The drying container lower plate 44 forms an inclined surface that is inclined downwards toward the discharge container 102. The drying container lower plate 44 and the lower rotary surface 54 may be disposed substantially parallel to each other.

In the state in which the drying container 42 is open toward the discharge container 102, the blower motor 69 of the heating device 66 may be operated. Thereby, the blower fan 68 may be rotated, and an object placed in the drying container 42 may therefore be smoothly moved to the discharge container 102.

Thereafter, the drying container lower plate 44 may be rotated in the reverse direction when the second body gears 16 are rotated in the reverse direction by the second body gear motor 18, or may be rotated in the reverse direction by the restoring force of the leaf springs. At this time, the portion of the drying container 42 that is open to the discharge container 102 may be closed. The drying container lower plate 44 and the lower rotary surface 54 may be disposed so as to be perpendicular to each other.

Seasoning Storage Unit

Hereinafter, the seasoning storage unit 80 will be described with reference to FIGS. 3 and 8A to 9.

The seasoning storage unit 80 includes a plurality of storage containers 82a, 82b, 82c, 82d and 82e, which are formed so as to be isolated from each other and to store plural kinds of seasoning. The plurality of storage containers 82a, 82b, 82c, 82d and 82e is arranged side by side in the horizontal direction. The plurality of storage containers 82a, 82b, 82c, 82d and 82e has a structure in which the upper sides thereof are open, and is arranged in the horizontal direction so as to be in surface contact with each other.

Each of the plurality of storage containers 82a, 82b, 82c, 82d and 82e includes a storage container lower plate 84, which has therein a plurality of openings 86 spaced apart from each other in the horizontal direction. Therefore, the seasoning stored in each of the plurality of storage containers 82a, 82b, 82c, 82d and 82e may be discharged downwards through the openings 86 in the storage container lower plate 84.

The seasoning storage unit 80 may include a drawer 88, to which the plurality of storage containers 82a, 82b, 82c, 82d and 82e is mounted and which is used to put or pull the plurality of storage containers 82a, 82b, 82c, 82d and 82e into or out of the main body 10. The drawer 88 may enable insertion or withdrawal of the plurality of storage containers 82a, 82b, 82c, 82d and 82e into or out of the main body 10.

A storage container cover 83 may be disposed at the upper side of the drawer 88 in order to open and close the upper sides of the plurality of storage containers 82a, 82b, 82c, 82d and 82e. An opening cover 90 may be disposed at the lower side of the drawer 88 in order to open and close the openings 86 in the plurality of storage containers 82a, 82b, 82c, 82d and 82e.

The opening cover 90 includes a plurality of covers 92b for covering the openings 86, which are spaced apart from each other in the horizontal direction, and a plurality of holes 92a for exposing the openings 86. The plurality of covers 92b and the plurality of holes 92a are alternately disposed. The opening cover 90 is disposed at the lower side of the drawer 88 so as to be movable in the horizontal direction.

A rack-gear-type structure 93a may be formed on one side of the opening cover 90, and a pinion gear 93b, which is engaged with the rack gear in order to move the opening cover 90 in the horizontal direction, may be disposed in the drawer 88. The pinion gear may be rotated by a drawer motor, which is secured to one side of the drawer 88.

When the drawer motor is operated, the opening cover 90 is moved in the horizontal direction so as to open or close the lower sides of the plurality of storage containers 82a, 82b, 82c, 82d and 82e.

The seasoning storage unit 80 may include a connection pipe 98, through which the seasoning discharged downwards from the plurality of storage containers 82a, 82b, 82c, 82d and 82e is delivered to the discharge container 102, and a guide pipe 94, through which the seasoning discharged from the plurality of storage containers 82a, 82b, 82c, 82d and 82e is delivered to the connection pipe 98.

The connection pipe 98 forms a passage, which extends in the upward-downward direction, above the discharge container 102. The guide pipe 94 may include an inclined surface 96 in order to guide the seasoning, which is discharged downwards from the plurality of storage containers 82a, 82b, 82c, 82d and 82e disposed horizontally, to the connection pipe 98.

The plurality of storage containers 82a, 82b, 82c, 82d and 82e, the guide pipe 94, and the connection pipe 98 are disposed above the discharge container 102. The connection pipe 98, the guide pipe 94, and the plurality of storage containers 82a, 82b, 82c, 82d and 82e are sequentially disposed from the bottom upwards.

Figure 8A:
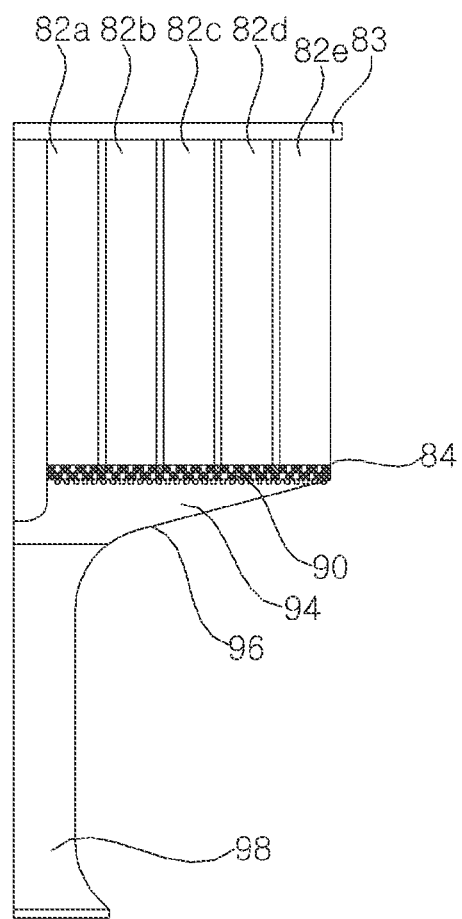
FIG. 8A is a schematic cross-sectional view of a seasoning storage unit according to an embodiment of the present disclosure.
Figure 8B:
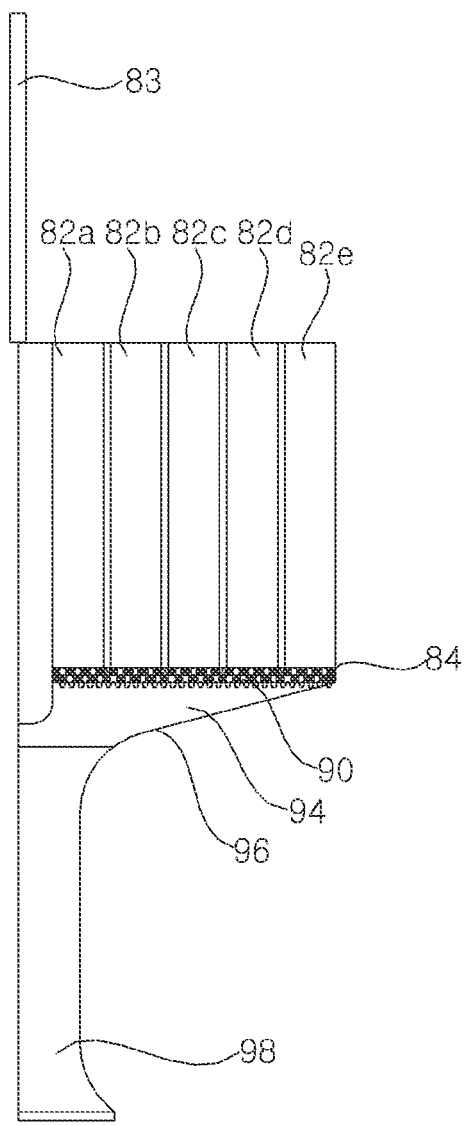
FIG. 8B is a view showing the state in which the storage container cover of FIG. 8A is open.
Figure 8C:
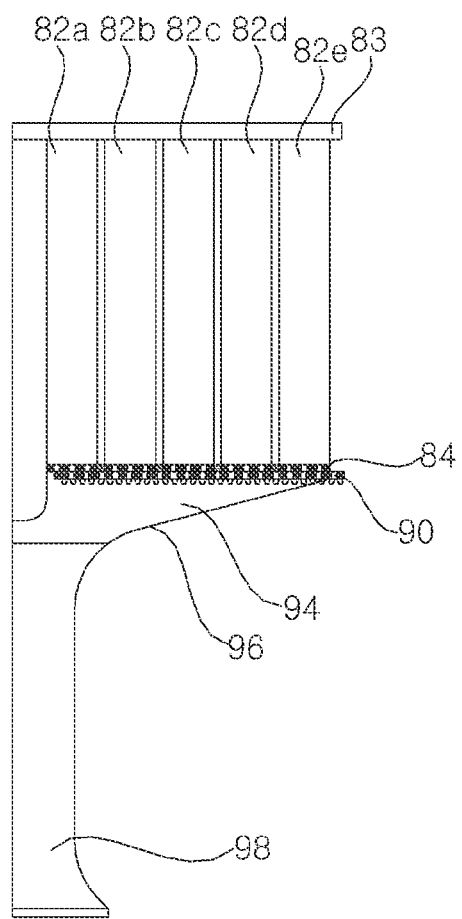
FIG. 8C is a view showing the state in which the opening cover of FIG. 8A is open.
Figure 9:
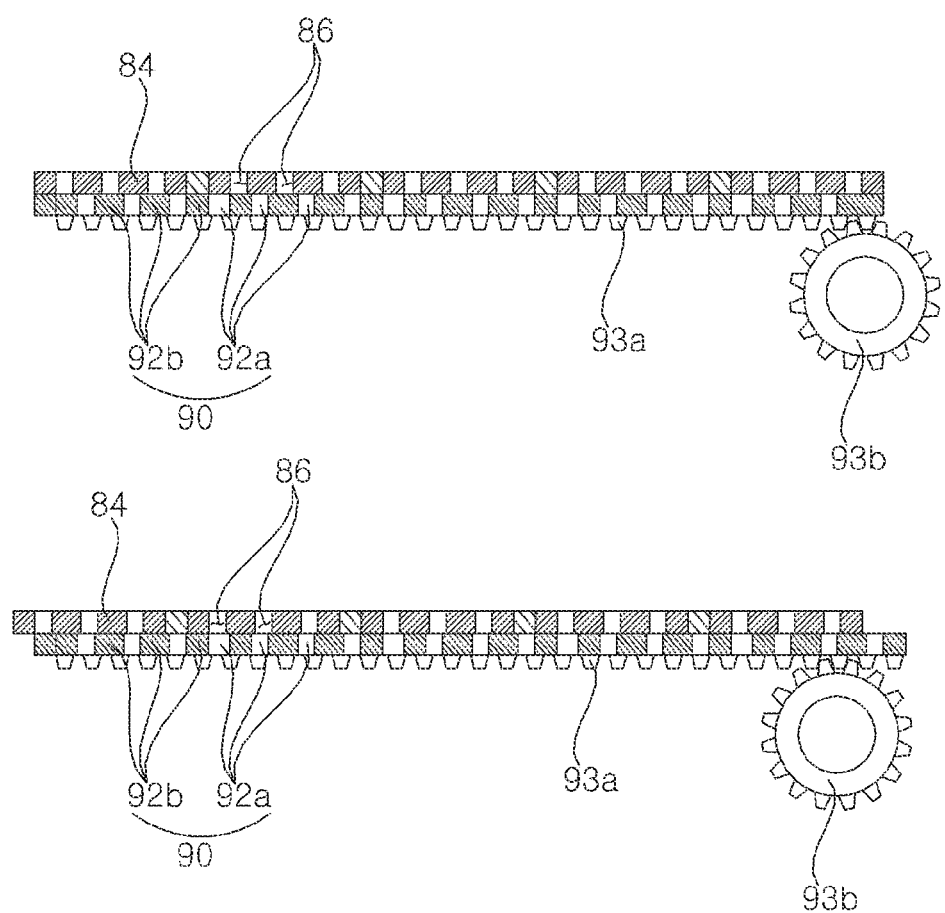
FIG. 9 is a view showing the opened and closed states of a storage container lower plate of the seasoning storage unit in accordance with operation of the opening cover according to an embodiment of the present disclosure.

The operation of the seasoning storage unit 80 will now be described with reference to FIGS. 8A to 9. The user may store seasoning in at least one of the plurality of storage containers 82a, 82b, 82c, 82d and 82e according to his/her preference. When an object is placed in the discharge container 102, the drawer motor of the drawer 88 is operated to move the opening cover 90 in the horizontal direction.

At this time, the plurality of holes 92a of the opening cover 90 are disposed under the openings 86 in the plurality of storage containers 82a, 82b, 82c, 82d and 82e, and the seasoning stored in the plurality of storage containers 82a, 82b, 82c, 82d and 82e is discharged to the guide pipe 94. The seasoning discharged to the guide pipe 94 may be moved to the discharge container 102 through the connection pipe 98.

Discharge Container

The discharge container 102 has therein an opening that faces upwards, and forms a space in which the ground and dried object is placed. The discharge container 102 is formed so as to be inserted into or drawn out of the main body 10. The discharge container 102 mounted in the main body 10 is disposed under the seasoning storage unit 80. The discharge container 102 mounted in the main body 10 is disposed at a lower position than the drying container 42.

The discharge container 102 mounted in the main body 10 is disposed under the space formed outside the first surface 50 of the drying container 42.

As is apparent from the above description, a food processor according to the present disclosure has one or more effects as follows.

First, it is possible to perform grinding, drying and seasoning on food ingredients so as to store the food ingredients for a long time and to use the same later. Since leftover food ingredients are processed into a state enabling subsequent use thereof, it is possible to minimize the amount of food ingredients that are thrown out as food waste.

Second, since a grinding container, a drying container, and a discharge container are connected to each other, various processes for treating food ingredients are performed sequentially, and thus it is possible to shorten the time taken to treat food ingredients.

Third, since a seasoning storage unit for adding seasoning to ground and dried food ingredients is provided, it is possible to add value to leftover food ingredients.

However, the effects achievable through the disclosure are not limited to the above-mentioned effects, and other effects not mentioned herein will be clearly understood by those skilled in the art from the above description.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. A food processor, comprising:
a main body;
a grinding container mounted in a portion of the main body, the grinding container including:
a grinder rotatably disposed in the grinding container;
a grinding motor configured to rotate the grinder; and
a grinding container lower plate configured to rotate;
a drying container mounted under the grinding container inside the main body, the drying container having an internal space;
a heating device disposed under the drying container, the heating device including a blower fan and a heater, the heating device being configured to supply heated air to the drying container by the blower fan and the heater; and
a discharge container detachably mounted under the drying container inside the main body, the discharge container having an internal space,
wherein the drying container comprises:
a drying container lower plate disposed on the heating device, the drying container lower plate having a mesh structure;
a drying container side plate extending vertically in an upward direction from an outer circumference of the drying container lower plate; and
first drying container gears secured to one end or both ends of the drying container lower plate on a rotation axis of the drying container lower plate,
wherein the drying container side plate comprises:
an upper fixed wall fixedly disposed at a position spaced upwards apart from the drying container lower plate; and
a lower rotary wall disposed under the upper fixed wall and rotatably coupled to the upper fixed wall,
wherein the drying container comprises second drying container gears disposed at two ends of the lower rotary wall and engaging the first drying container gears and configured to rotate to cause an object dried in the drying container to be discharged to the discharge container,
wherein rotation of the grinding container lower plate causes a ground object to move from the grinding container to the drying container,
wherein rotation of the drying container lower plate causes the ground object to move from the drying container to the discharge container,
wherein the lower rotary wall rotates outward from the drying container when the drying container lower plate rotates inward into the drying container, causing the drying container to open towards the direction of the discharge container,
wherein, when the drying container lower plate rotates inward into the drying container, the blower fan blows air to the drying container.

2. The food processor according to claim 1, wherein the grinding container comprises:
a grinding container lower plate on which the grinder and the grinding motor are disposed; and
a grinding container side plate extending vertically in an upward direction from an outer circumference of the grinding container lower plate and forming an internal space in the grinding container.

3. The food processor according to claim 2, wherein the grinding container lower plate is rotatably coupled to a portion of the grinding container side plate, and
wherein the grinding container lower plate is rotatable between a first position perpendicular to the grinding container side plate and a second position inclined downward into the drying container.

4. The food processor according to claim 3, wherein the grinding container further comprises grinding container gears disposed at two ends of the grinding container lower plate and configured to rotate together with the grinding container lower plate, and
wherein the food processor further comprises first body gears provided in the main body and engaged with the grinding container gears.

5. The food processor according to claim 4, wherein the grinding container further comprises a grinding container cover hingedly coupled to the grinding container side plate and configured to open and close.

6. The food processor according to claim 1, further comprising:
an inner container having a hollow cylindrical shape and disposed inside the grinding container.

7. The food processor according to claim 1, wherein the drying container lower plate is rotatably coupled to the drying container side plate.

8. The food processor according to claim 1, wherein the drying container side plate comprises:
a first wall disposed inside the main body; and
a second wall exposed to an outside of the main body,
wherein the first wall comprises the upper fixed wall and the lower rotary wall, and
wherein the second wall includes an upper portion having a discharge hole, the discharge hole being configured to discharge heated air supplied from the heating device to outside of the food processor.

9. The food processor according to claim 8, wherein the second wall includes a protruding rib formed on an inner side of the second wall configured to limit a range of upwards rotation of the drying container lower plate.

10. The food processor according to claim 1, when the drying container lower plate is rotated into a space defined by the drying container side plate, the lower rotary surface is rotated to an outside of the drying container.

11. The food processor according to claim 10, further comprising second body gears configured to mesh with the second drying container gears to cause the second drying container gears to rotate.

12. The food processor according to claim 1, wherein the heating device further incudes a blower motor configured to rotate the blower fan, and
wherein the blower fan blows air heated by the heater into the drying container.

13. The food processor according to claim 1, further comprising a seasoning storage disposed above the discharge container to store seasoning, the seasoning storage configured to discharge stored seasoning into the discharge container.

14. The food processor according to claim 13, wherein the seasoning storage comprises a plurality of storage containers isolated from each other and configured to store plural kinds of seasoning,
wherein each storage container comprises a storage container lower plate having a plurality of openings spaced apart from each other in a horizontal direction, and
wherein the food processor further comprises an opening cover disposed at a lower side of the seasoning storage configured to open and close the plurality of openings in the storage container lower plates.

15. The food processor according to claim 14, wherein the opening cover comprises:
a plurality of covers configured to cover the plurality of openings in the storage container lower plates and spaced apart from each other in the horizontal direction; and
a plurality of holes configured to expose the plurality of openings in the storage container lower plates, and
wherein the plurality of covers and the plurality of holes are alternately disposed.

* * * * *